L. SCHARFF.
Water Filter and Cooler.
No. 127,926.        Patented June 11, 1872.
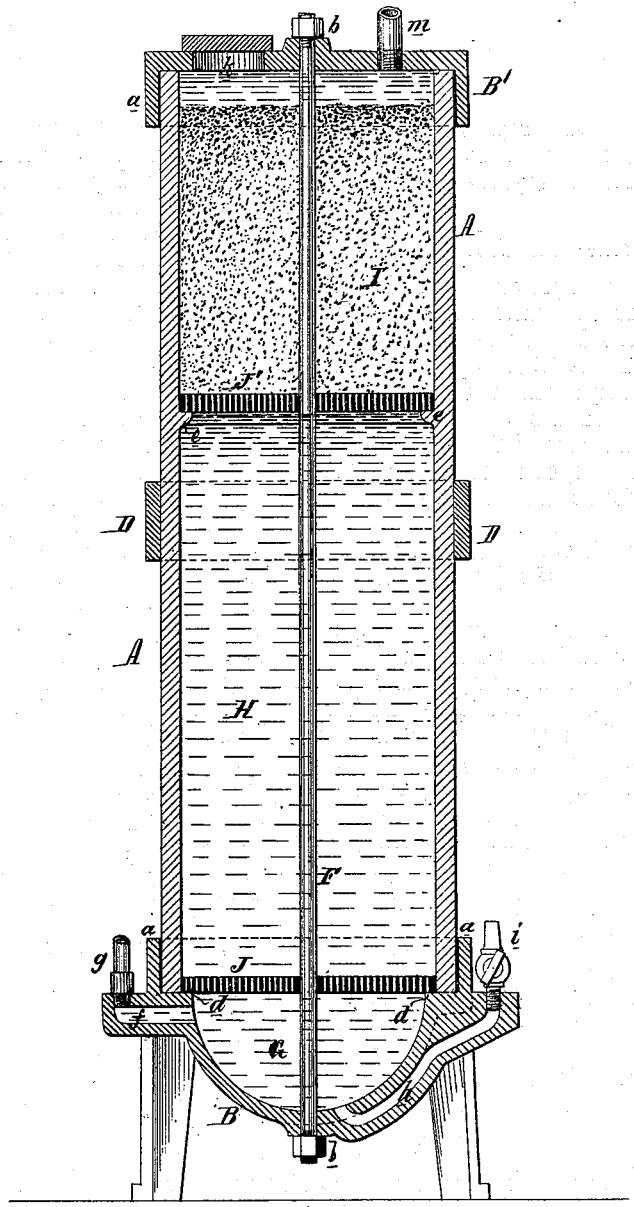

UNITED STATES PATENT OFFICE.

LOUIS SCHARFF, OF SPRING MILL, PENNSYLVANIA.

IMPROVEMENT IN WATER FILTERS AND COOLERS.

Specification forming part of Letters Patent No. 127,926, dated June 11, 1872.

Specification describing an Improved Water Filter and Cooler, invented by LOUIS SCHARFF, of Spring Mill, Montgomery county, Pennsylvania.

*Improved Water Filter and Cooler.*

My invention consists of improvements fully described hereinafter, in the water filter and cooler for which Letters Patent No. 51,485 were granted to me on the 12th day of December, 1865, the said improvements having been designed mainly with the view of simplifying and reducing the cost of the apparatus, and of strengthening it, so as to prevent leakage, and to enable it to resist the internal pressure to which it is subjected.

In the accompanying drawing, the figure represents a vertical section of my improved water filter and cooler.

The body of the apparatus consists of a cylinder, A, of terra cotta or earthenware, glazed inside and outside, and closed at its upper and lower ends by flanged caps or heads, B and B', of cast-iron. The cylindrical body is also braced by a metal band or bands, D. The flanges $a$ $a$ of the heads B and B' overlap the ends of the cylinder A, and the joints are suitably packed to prevent leakage, and the said heads are secured together and held against the ends of the cylinder by a rod or bolt, F, passing entirely through the latter, and through holes in the center of the heads, outside of which it is provided with tightening-nuts $b$ $b$. The interior of the apparatus is separated into three chambers, G, H, and I, by two perforated partitions, J and J', of earthenware or other material, the former of which rests upon an internal shoulder, $d$, of the lower head B, and the latter upon a ledge, $e$, formed within the cylindrical body A of the apparatus. The lower or sediment-chamber G, is formed entirely within the semi-spherical lower head B, beneath the perforated partition J, and at one side of the head close to the top of the said chamber is formed a hollow branch, $f$, into which is screwed an inlet-pipe, $g$, while with the bottom of the chamber communicates a passage, $h$, formed in an enlargement of the head, and extending upward around the latter to the top of the same, where it terminates in a blow-off cock, $i$. The central or water-chamber H is of greater capacity than either of the other chambers, and is situated between the two perforated partitions J and J', and the uppermost chamber I, above the latter partition, is filled or nearly filled with a mixture of sand and charcoal, or other filtering medium, to which access can be obtained through a hand-hole, $k$, in the upper cap B, the latter being also provided with an outlet-pipe, $m$.

If the apparatus is to be used as a water-cooler, as well as a filter, it may be arranged within an ice-box, or may be buried beneath the surface of the ground, and it may also, if desired, be combined with a receiving vessel, communicating with the upper chamber I through the pipe $m$, as described in my aforesaid patent of December 12, 1865; but I propose in most cases to make the apparatus of sufficient capacity to enable the second vessel or reservoir to be dispensed with.

In using the apparatus the blow-off cock $i$ is closed, and water under pressure is admitted into the chamber G through the inlet-pipe $g$ and branch $f$. This water, after filling the chamber G, will rise through the perforated partition J into the chamber H, and, after filling the latter, will pass through the perforated partition J', and through the filtering medium in the chamber I, and may be drawn off finally through the outlet-pipe $m$. The coarser impurities will be separated from the water by the perforated partitions J and J', and will be deposited in the form of sediment upon the bottom of the chamber G, and the finer impurities will be entirely separated by the filtering medium in the upper chamber, so that perfectly clear water can be drawn from the latter.

The apparatus can be cleansed at any time by closing the cock in the outlet-pipe $m$, opening the cock $i$, and forcing the water and sediment from the chamber G through the passage $h$ and blow-off cock.

The principal objection to my former filter and cooler, was its liability to fracture, or to leak at the joints, owing to the internal pressure of the water, which in some localities is excessive; but these objections I have entirely overcome by the system of bracing adopted in the present apparatus.

I claim as my invention—

1. The dished or semi-spherical head B of the apparatus cast with passages $f$ and $h$, communicating with an inlet-pipe and blow-off cock, as described.

2. The combination of the head B and its flange $a$ and internal shoulder $d$, with the body A of the apparatus, and perforated partition J.

In testimony whereof I have signed my name to this specification in the presence of two subscribing witnesses.

LOUIS SCHARFF.

Witnesses:
 WM. A. STEEL,
 JOHN K. RUPERTUS.